United States Patent [19]

Karabestos et al.

[11] Patent Number: 5,788,441
[45] Date of Patent: Aug. 4, 1998

[54] LIGHTWEIGHT, COMPACT, THREADED FASTENER AND THREAD ROLLING DIE FOR MAKING SAME

[75] Inventors: Nicholas C. Karabestos, Acton; Gary L. Stewart, Oak Hills, both of Calif.

[73] Assignee: West Coast Aerospace, Inc., Victorville, Calif.

[21] Appl. No.: 775,939

[22] Filed: Jan. 3, 1997

[51] Int. Cl.$^6$ ............ F16B 35/00; F16B 35/04; B21H 3/02; B21D 17/04
[52] U.S. Cl. ............ 411/366; 411/411; 411/424; 72/88; 72/469; 470/10
[58] Field of Search .................. 411/366, 411, 411/424, 426, 414; 72/88, 469; 470/10

[56] References Cited

U.S. PATENT DOCUMENTS

4,735,537  4/1988  Rath .............................. 411/411
4,915,559  4/1990  Wheeler et al. ................ 411/424 X
5,039,265  8/1991  Rath et al. ..................... 411/366

*Primary Examiner*—Neill R. Wilson
*Attorney, Agent, or Firm*—Oppenheimer Wolff & Donnelly LLP

[57] ABSTRACT

The present invention provides an improved, lightweight, compact threaded fastener that has a relatively shortened transition thread rollout zone between the grip of the fastener and the threaded shank of the fastener. This transition zone is shortened due to the fact that the runout (or inner end) of the rolled thread on the fastener extends no more than one-third the circumference of the rolled thread at its pitch diameter. The short runout of the rolled thread does not compromise the strength of the fastener, because the runout does not have a relatively abrupt transition. Instead, the depth of the runout of the rolled thread of the fastener gradually decreases along its length from a depth equal to the uniform depth of the rolled thread throughout the length of the threaded shaft of the fastener to no depth at the very end of the runout. The invention further provides a pair of thread rolling dies for producing such an improved, lightweight, compact threaded fastener.

13 Claims, 5 Drawing Sheets

LIGHTWEIGHT, COMPACT, THREADED FASTENER AND THREAD ROLLING DIE FOR MAKING SAME

FIELD OF THE INVENTION

The present invention relates in general to threaded fasteners and the thread rolling dies for forming the threads of the fasteners and relates in particular to an improved threaded fastener that is more lightweight and compact than conventional threaded fasteners and is at least as strong as conventional threaded fasteners and relates in particular to the improved thread rolling die for forming the threads of the threaded fastener.

BACKGROUND OF THE INVENTION

The use of fasteners is essential in aerospace and aircraft applications. Because, in such aerospace and aircraft applications, the fastener will be exposed to great stress, size, and weight requirements, there are many qualities that are necessary for a fastener to be successfully used in such applications. Most notable of these qualities are that the fastener be as small as possible, that the fastener be as lightweight as possible, and that the fastener be as strong as possible. Accordingly, any savings in length and weight of the fasteners, without compromising the strength of the fasteners, in such aerospace and aircraft applications, are welcome.

The size, strength, and weight of a fastener is dependent upon many factors, including the length of the runout of the rolled thread on the fastener. The threads of such fasteners are generally produced by a thread rolling process. During the thread rolling process, a fastener blank is rolled between two opposed dies. Each of the dies have ridges complementary to the thread being produced. These ridges run out at one edge of the die. It is at this edge of the die that the runout (or inner end) of the thread is formed by the ridges onto the fastener.

In one conventional die, the ridges of the dies which form the rolled threads are at a shallow acute angle with respect to the die edge. The geometry of these ridges causes a feather edge to be produced on these ridges, which makes the ridges of the dies susceptible to breakage. One solution to the breakage problem caused by the geometry of the ridge with respect to the edge of the die is that the ridges of the die are tapered as the edge is approached, becoming more shallow at the edge to provide adequate strength at that portion of the die. As a result, the rolled thread formed by this conventional die has a relatively long rollout at the inner end of the thread where the thread contour is not complete.

A fastener produced by this conventional die will contain a transition portion between its grip portion and its threaded portion that contains at least two or more turns of thread that are incomplete, i.e., the transition portion has less than a fully formed thread. This incomplete portion of thread cannot carry any load and hence does nothing to enhance the performance of the fastener, while at the same time increasing the length and weight of the fastener. Because the fastener shank must be made sufficiently long to include the runout thread at its inner end, as well as the portion of the thread that carries the load, the transition section where the thread runout occurs has a length axially of the shank corresponding to twice the pitch of the thread. This extra length of the transition section adds considerably to the length and weight of the fastener. This extra length and weight is detrimental to aerospace and aircraft applications, where a saving in weight and size of the fasteners is essential.

One method for reducing the size and weight of the fasteners is to reduce the length of the runout of the rolled thread on the fastener. U.S. Pat. No. 4,735,537 to Rath discloses one known method for reducing the length of the runout of the rolled thread on the fastener, thereby reducing the size and weight of the fastener. Rath discloses a fastener having a relatively abrupt transition from an unthreaded portion to full thread dimension and discloses a die for making such a fastener.

The threaded fastener disclosed by Rath improves upon the fastener described above that is produced by the conventional thread rolling die, but still has its drawbacks. Rath discloses a thread rolling die wherein the ridges of the die have relatively abrupt ends, which preferably are convexly rounded with compound curvature, which are known as bumps or cavities. Thus, the thread rolling die of Rath produces a runout of thread on the fastener that has an abrupt end transition and which extends no more than one-fourth the circumference of the rolled thread at its pitch diameter. As a result of the abrupt end to the runout of the thread of the fastener, the length of the transition section where the thread runout occurs has a length axially of the shank corresponding to only one pitch of the thread. This reduction of the length of the transition section of the fastener from the conventional fastener is a significant savings in terms of weight and length of the fastener. However, the reduction in weight and length of the fastener may be compromised by the fact that the abrupt transition from the unthreaded portion to the full thread dimension in the Rath fastener is a weakness on the fastener, thereby making the fastener susceptible to reduced properties in the area of this relatively abrupt transition.

Another threaded fastener is known which attempts to improve upon the threaded fastener disclosed by Rath. This threaded fastener and its corresponding thread rolling die are those sold under the trademark VeriLite. The VeriLite fastener has a runout of the rolled thread that does not end as abruptly as the fastener disclosed by Rath, but does end more abruptly than the runout of the thread of the conventional fastener described above. The VeriLite fastener is formed by a thread rolling die which differs from the thread rolling die disclosed by Rath in that the top surface of the die has a plurality of beveled surfaces which forms a 45 degree angle between the end edge of ridges of the die and the beveled surfaces. It is this 45 degree angle between the edge of the ridge and the beveled surface of the top of the die that produces the less abrupt runout of the rolled thread on the VeriLite fastener. Although the VeriLite fastener has a reduced size and weight as compared to the conventional fasteners described above, the VeriLite fasteners have the disadvantage that even this revised transition from the unthreaded portion to the full thread dimension in the VeriLite fastener (as compared to the Rath fastener) is still so abrupt as to cause stress concentration in this area, thereby making the fastener susceptible to reduced properties in the area of this transition under peak load conditions. Further, it is known that the 45 degree angle between the edge of the ridge and the beveled surface of the top of the die may break under stress or prolonged use.

In addition, the length and weight of the fastener is also dependent on the ability of the threaded nut, which connects with the threaded fastener, to have full thread capabilities within as few rotations of the nut as possible. In other words, the fewer rotations of the nut means that a shorter length of the shaft of the fastener is necessary to fully connect the nut to the fastener. It also means that the threaded nut can be made smaller and more lightweight. Thus, a threaded fastener and threaded nut that connect together with full thread capabilities in the fewest rotations of the nut provides the benefits of a shorter and thus lighter fastener and nut. Prior threaded fasteners that are produced from blank fasteners that have a chamfered end require one and one-half rotations of the nut for full-thread capabilities.

Accordingly, it will be appreciated from the foregoing that there is a definite need for an improved lightweight, compact, threaded fastener and thread rolling die for making same. Such threaded fastener should be easily and inexpensively manufactured, should have its weight and size minimized as much as possible, should be as strong as possible, i.e., such that the transition from the unthreaded portion to the full thread dimension in the fastener is strong enough for the intended purposes of the fastener, and should be able to connect with a threaded nut with full thread capabilities in the fewest possible rotations of the nut. Such thread rolling die should be capable of forming such a fastener from a fastener blank and be capable of longer life. The present invention meets these needs.

SUMMARY OF THE INVENTION

In accordance with the present invention, an improved, lightweight, compact, threaded fastener is provided that is easily and inexpensively manufactured, that has its weight and size minimized as much as possible, that has a transition from the unthreaded portion to the full thread dimension in the fastener that is strong enough for the intended purposes of the fastener, and that has the ability to connect with a threaded nut with full thread capabilities in the fewest possible rotations of the nut.

The fastener of the present invention preferably has a relatively shortened transition thread rollout zone between the grip of the fastener and the threaded shank of the fastener. This transition zone is shortened due to the fact that the runout (or inner end) of the rolled thread on the fastener extends no more than one-third the circumference of the rolled thread at its pitch diameter. This short runout of the rolled thread does not compromise the strength of the fastener, because the runout does not have a relatively abrupt transition. Instead, the depth of the runout of the rolled thread of the fastener of the present invention gradually decreases along its length from a depth equal to the uniform depth of the rolled thread throughout the length of the threaded shaft of the fastener to no depth at the very end of the runout.

By providing such a runout on the threaded fastener of the present invention, the transition zone will not exceed a distance corresponding to between one pitch and one and one-half pitches of the thread. Thus, the threaded fastener of the present invention has a length of its transition zone that is less than the two pitch length of the transition zone of the known conventional threaded fasteners and thus will have the benefit of a weight and size savings over the conventional threaded fasteners. Further, the threaded fastener of the present invention will obtain these weight and size benefits without compromising the strength of the shaft of the threaded fastener.

In further accordance with the present invention, the fastener of the present invention is formed by a pair of thread rolling dies. Each thread rolling die preferably has a plurality of spaced parallel ridges on at least one of its sides. The ridges are preferably complementary to the thread to be produced on the fasteners of the present invention. The ridges of the dies of the present invention are capable of producing the inventive runout (or inner end) of the rolled thread on the fastener, wherein the runout extends no more than one-third the circumference of the rolled thread at its pitch diameter and wherein the depth of the runout gradually decreases along its length from a depth equal to the uniform depth of the rolled thread throughout the length of the threaded shaft of the fastener to no depth at the very end of the runout. The ridges of the dies of the present invention produce such a runout, because the top surface of the dies of the present invention each have a plurality of beveled surfaces being adjacent to the end surfaces of the ridges of the die and each have a plurality of second surfaces, each second surface being adjacent to and forming a 30 degree angle with one of the beveled surfaces and forming a 30 degree angle with the end of the ridge. It is this 30 degree angle between the second surface, the beveled surface of the top of the die, and the end of the ridge that produces the runout (or inner end) of the rolled thread on the fastener, wherein the runout extends no more than one-third the circumference of the rolled thread at its pitch diameter and wherein the depth of the runout gradually decreases along its length from a depth equal to the uniform depth of the rolled thread throughout the length of the threaded shaft of the fastener to no depth at the very end of the runout. This 30 degree angle also provides the benefit of prolonged die life as compared with a die having a 45 degree or greater angle.

The fastener of the present invention, when coupled with a complementary threaded nut, is capable of providing even further weight and size savings. After the threads of the fastener of the present invention are formed by the dies, the end of the fastener to which the threaded nut is coupled is chamfered at a 45 degree angle. By chamfering the end of the fastener at the outer end of the threads, the outer end runout of the thread is removed. Thus, the threaded nut is capable of being connected to the threads of the fastener within the first rotation of the nut onto the threaded fastener. In other words, the full thread capabilities of the fastener are developed within the first rotation of the threaded nut onto the fastener. The ability of the threaded nut to have full thread capabilities within the first rotation of the nut onto the fastener provides weight and length savings, in addition to increased accessibility over prior fasteners, because the length of the fastener necessary to secure the fastener to the nut of the present invention is much less than the length of the threaded fastener necessary to secure the fastener to the nut of previous fasteners.

The fasteners of the present invention, having a nut that is capable of being connected to the threads of the fastener within the first rotation of the nut onto the threaded fastener, provide additional advantages where weight savings are important. Because the nut is capable of being connected to the threads of the fastener within the first rotation of the nut onto the threaded fastener, the fastener will have increased versatility by being able to secure together articles with limited accessibilities. This allows bolt inventory to be reduced because fewer sizes are necessary to accomplish a full range of fastening requirements.

In addition, the threaded nut provides the additional feature of a locking mechanism, which locks the threaded nut onto the shaft of the fastener thereby preventing the nut from unthreading or from being threaded any further along the threaded fastener than is necessary to secure the threaded nut to the fastener. This locking mechanism of the threaded nut is preferably a non-circular portion of the opening of the threaded nut which permits the nut to be threaded within at least one rotation on the threaded fastener so as to permit full thread capabilities and thereby secure fastener and the nut together. The threaded nut utilized in the present invention is preferably a self-aligning (7 degree) self-locking nut, as is known to those of ordinary skill in the art.

Other objects, features, and advantages of the present invention will become apparent from a consideration of the following detailed description and from the accompanying drawings.

DETAILED DESCRIPTION OF THE PREFERRED EMBODIMENTS

The present invention is embodied in an improved, lightweight, compact threaded fastener and thread rolling die for manufacturing such fasteners. In addition to the benefits of being lightweight and compact, the fasteners of the present invention have the benefits of being easily and inexpensively manufactured, being strong enough to withstand the stresses and strains in airplane and aerospace applications, and being capable of being connected to a threaded nut which has full thread capabilities within the first rotation of the threaded nut onto the threads of the fastener.

Figure 1:
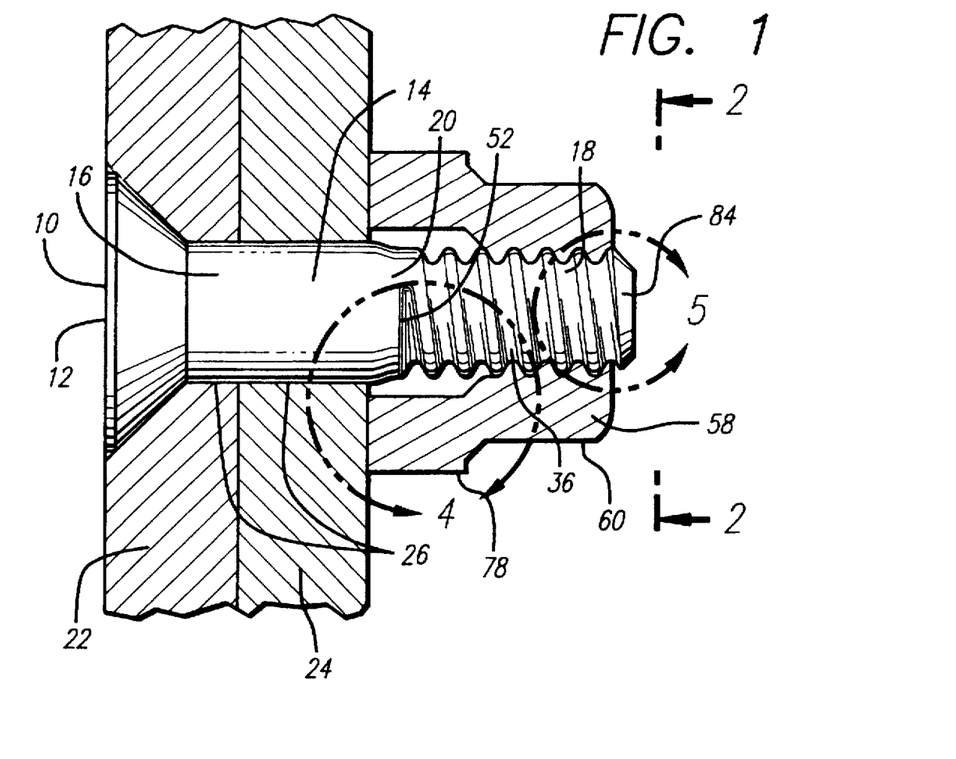
FIG. 1 is a longitudinal sectional view of a threaded nut connected with a threaded fastener made in accordance with the present invention.

In the particular embodiments shown in the drawings and herein described, the lightweight, compact threaded fastener 10 comprises a head 12 and a shank 14 projecting from the head. (See FIG. 1.) The shank 14 preferably has three portions—a first portion 16 being adjacent to the head 12; a second portion 18; and a third portion 20 interconnecting the first and second portions 16 and 18 of the shank 14. The fastener 10 of the present invention preferably fastens together at least two fastened elements, a first fastened element 22 and a second fastened element 24, as shown in FIG. 1. Both the first fastened element 22 and the second fastened element 24 have an opening 26 for accepting the shank 14 of the fastener 10. The thickness of the fastened elements will determine the length of the shank of the fastener to be used. The fastener of the present invention may be of any length capable of holding together at least two fastened elements, while at the same time being capable of being thread with a threaded nut, as discussed below.

Figure 1A:
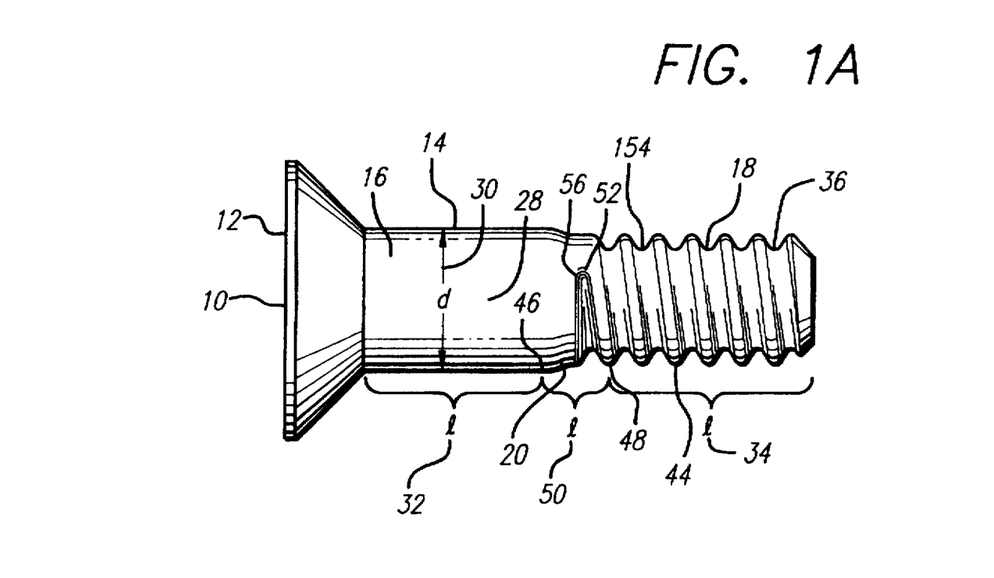
FIG. 1A is an elevational view of the fastener.

The first portion 16 of the shank 14 preferably has a straight, cylindrical exterior surface 28 of a relatively large diameter 30 and of a predetermined length 32. (FIGS. 1 and 1A.) The first portion 16 of the shank 14 is unthreaded. The first portion 16 of the shank 14 is commonly known to those of ordinary skill in the art as the grip of the fastener.

The second portion 18 of the shank 14 is also cylindrical and preferably is of a predetermined length 34. (FIGS. 1 and 1A.) The exterior surface of the second portion 18 of the shank 14 has a rolled thread 36 along the entirety of its length. The rolled thread 36 is preferably of a uniform depth 38. The rolled thread 36 of the second portion 18 of the shank 14 is preferably formed by a pair of thread rolling dies 40, 42 as described in more detail below and shown in FIGS. 4–6. The major diameter 44 of the second portion 18 of the shank 14 is preferably no greater than the diameter 30 of the first portion 16 of the shank 14.

The third portion 20 of the shank 14 lies between and interconnects the first portion 16 of the shank 14 to the second portion 18 of the shank 14, and thus provides a transition section between the first and second portions of the shank. (See FIGS. 1 and 4.) The third portion 20 of the shank 14 extends axially from a first end 46 adjacent to the first portion 16 of the shank 14 to a second end 48 adjacent to the second portion 18 of the shank 14 in a predetermined length 50. The diameter of the third portion 20 of the shank 14 is different from the diameters of both the first and second portions 16, 18 of the shank 14 and preferably decreases from a greater diameter at its first end 46 to a lesser diameter at its second end 48.

The rolled thread 36 of the second portion 18 of the shank 14 ends within the third portion 20 as an inner end part 52. (See FIGS. 1 and 4.) The depth of the rolled thread 36 of the inner end part 52 gradually decreases from a depth equal to the uniform depth 38 of the rolled thread 36 throughout the second portion 18 of the shank 14 at the second end portion 48 of the third portion 20 of the shank 14 to no depth at the end 56 of the inner end part 52. The inner end part 52 of the rolled thread 36 within the third portion 20 of the shank 14 preferably extends no more than one-third the circumference of the rolled thread 36 at its pitch diameter. Thus, there is a relatively short transition from the full depth of the rolled thread 36 at the second end portion 48 of the third portion 20 of the shank 14 to no depth at the end 56 of inner end part 52.

Figure 4:
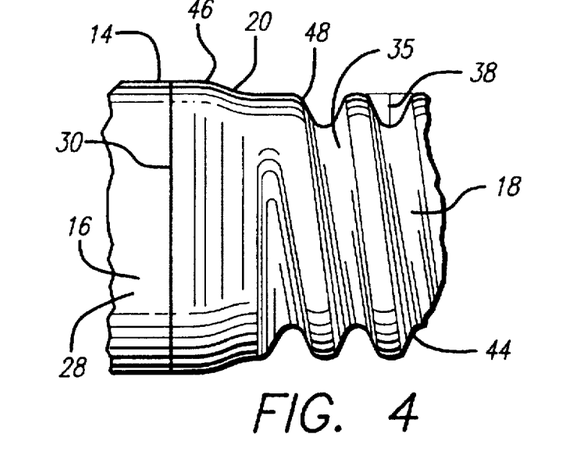
FIG. 4 is an enlarged fragmentary elevational view taken along the circle 4 of FIG. 1, showing the inner end portion of the rolled thread of the fastener of FIG. 1.

The fact that there is such a relatively short transition and that the inner end part 52 of the rolled thread 36 extends no more than one-third the circumference of the rolled thread at its pitch diameter provides many benefits to the fastener 10 of the present invention. First, the relatively short transition which occurs within one-third the circumference of the rolled thread, provides for a much shorter axial length 50 for the third portion 20 of the shank 14 as compared with the conventional fasteners described above. In accordance with the present invention, the length 50 of the third portion 20 of the shank 14 is preferably between one pitch and one and one half pitch of the rolled thread 36. This is less than the two pitch or greater length of the same portion in the conventional fasteners described above. Further, although the length 50 of the third portion 20 of the shank 14 of the present invention is slightly greater than the length of the same portion in the Rath fastener described above, the third portion 20 of the shank 14 has a less abrupt transition at the inner end part 52 of the rolled thread 36 than the abrupt transition in the Rath fastener. This less abrupt transition in the present invention may permit the shaft 14 of the fastener 10 to be stronger than that of Rath and thus withstand greater stresses without breakage. In other words, the inner end part 52 of the present invention does not suffer from the potential weakness found in the inner end part of the Rath fastener at this portion. Therefore, the fastener of the present invention is less susceptible to reduced properties under peak stress conditions present in aircraft and aerospace applications than the Rath fastener. Further, the fastener of the present invention has been found to be as strong or stronger than the VeriLite fastener.

Figure 2:
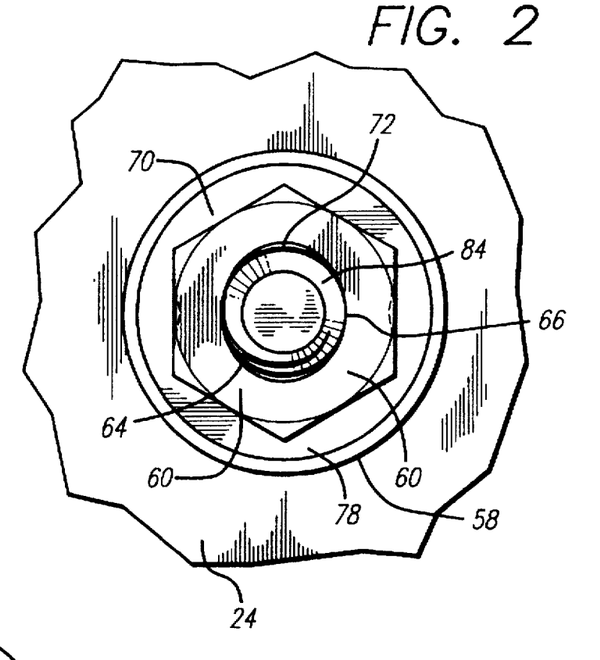
FIG. 2 is an elevational view of the threaded nut connected with a threaded fastener taken along the lines 2—2 of FIG. 1.
Figure 2A:
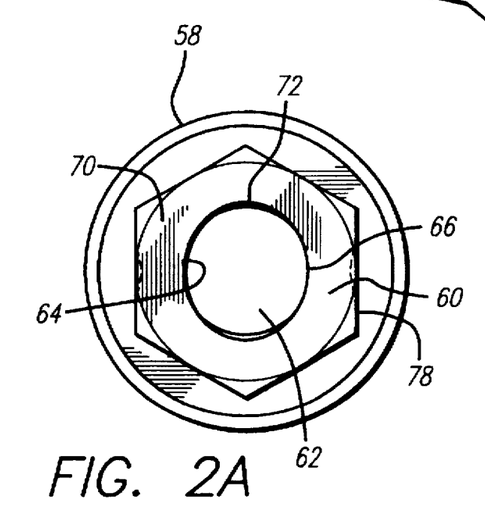
FIG. 2A is an elevational view of the fastening element of the threaded nut.
Figure 3:
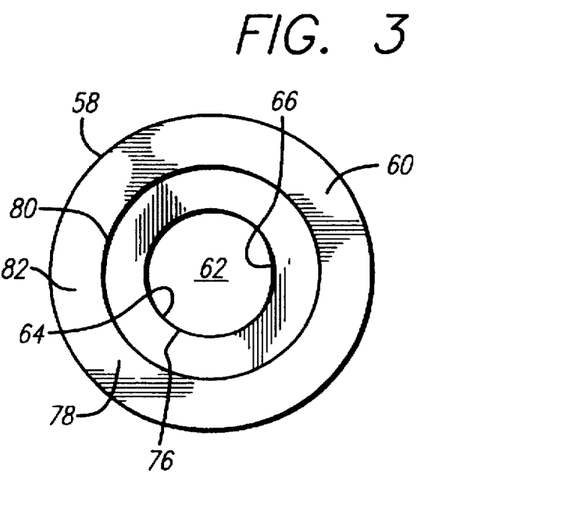
FIG. 3 is an elevational view of the washer element of the threaded nut.

A threaded nut 58 is provided for use in combination with the fastener 10 of the present invention. (See FIGS. 1, 2, and 3.) The threaded nut is preferably a self-aligning (7 degree), self-locking nut, as is known to those of ordinary skill in the art. The threaded nut 58 preferably comprises a fastening element 60 having an opening 62 along its axial length. This opening 62 preferably has an inside surface 64 having a thread 66 thereon of uniform depth along a predetermined distance along the axial length of the inside surface of the opening 62. The thread 66 of the fastening element 60 is preferably threadable with the rolled thread 36 of the second portion 18 of the shank 14 of the fastener 10. The threaded nut 58 may also include an outer wrenching surface 68 such that the outer wrenching surface 68 of the nut may be gripped by a wrench and twisted, as is well known by those of ordinary skill in the art. Although a particular wrenching surface is shown in the drawings herein, it should be understood that any wrenching surface may be utilized, as is well known by those of ordinary skill in the art.

The fastening element of the threaded nut preferably includes a locking element 70 for locking the threaded opening 62 of the fastening element 60 to the second portion 18 of the shaft 14 of the fastener 10. (See FIGS. 1, 2, and 3.) The locking element 70 preferably comprises a non-circular portion 72 of the opening 62 of the fastening element 60 along a predetermined distance along a portion of the axial length of the opening 62 of the fastening element 60. In other words, a portion of the opening 62 of the threaded nut 58 on the side of the opening 62 that is not threaded onto the shank 14 of the fastener 10 is non-circular 72 so that the threaded nut 58 is locked onto the circular shank 14 of the fastener 10 due to the non-circular shape 72 of the opening 62 at that portion of the threaded nut 58. The threaded nut 58 is locked to the shaft 14 so that, as the threaded nut 58 is tightened onto the shaft 14 of the fastener 10, the threaded nut 58 will be more difficult to unthread and remove when the threads 36 of the threaded nut 58 reach the transition 64 from the circular portion of the opening 62 to the non-circular portion 72 of opening 62.

The threaded nut 58 may further include a washer element 78 projecting from the fastening element 60. (See FIGS. 1, 2, and 3.) The washer element 78 preferably has an unthreaded opening 80 for accepting the shank 14 of the fastener 10 of the present invention. The washer element 78 further preferably has a lower edge 82 which flares outwardly. When the fastener 10 is connected with the threaded nut 58 and is connecting together the fastened element, this lower edge 82 contacts the second fastened element 24 and provides the benefit of further locking the threaded nut 58 to the second fastened element 24 and thereby further prevents the threaded nut 58 from unthreading.

In another preferred embodiment of the present invention, the second portion 18 of the shank 14 of the fastener 10 of the present invention has an end portion 84 which is chamfered, preferably at an angle of 45 degrees. (See FIGS. 1 and 5.) If the fastener 10 is formed from a titanium blank 90, then the chamfer is made in the end of the second portion 84 after the rolled thread 36 is formed on the blank fastener 90, as is described below. Thus, after the chamfer is made in the threaded fastener, the outer end of the thread, which may not be fully developed, will be removed to form the chamfer. Thus, the remaining rolled thread 36 at the chamfered end portion 84 will be fully developed, thereby allowing the full thread capabilities of the rolled thread 36 of the fastener to be developed within the first rotation of the threaded nut 58 onto the second portion 18 of the shank of the fastener. If, however, the fastener 10 is formed from alloy or stainless steel, the blank 90 is chamfered prior to the thread rolling process.

Figure 5:
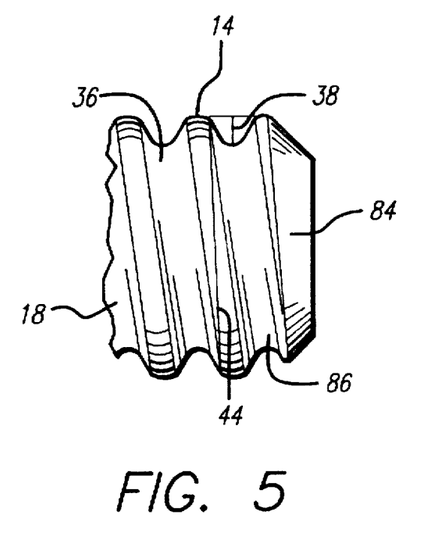
FIG. 5 is an enlarged fragmentary elevational view taken along the circle 5 of FIG. 1, showing the chamfered end portion of the shank of the fastener of FIG. 1.
Figure 6:
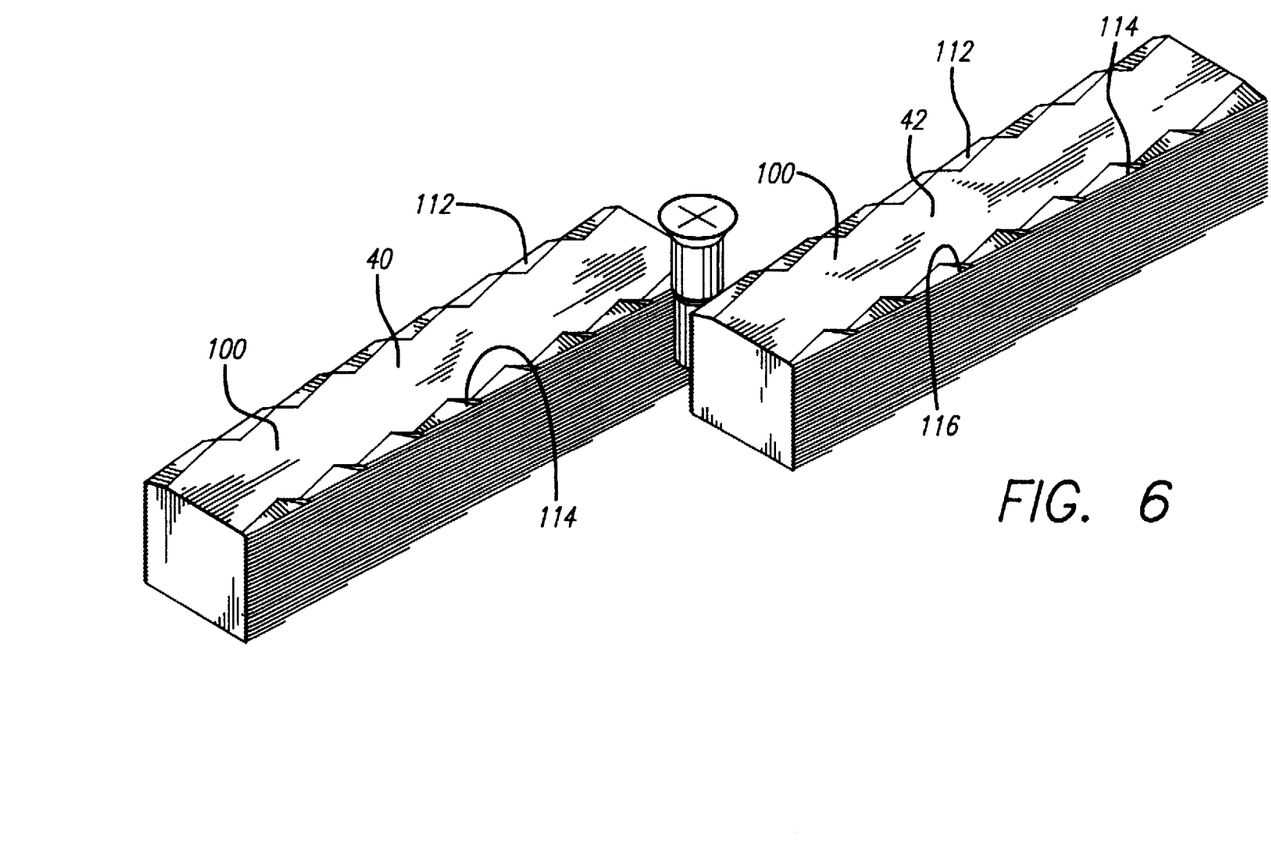
FIG. 6 is a perspective view of the thread rolling dies performing the thread rolling operation.

The rolled thread 36 of the second portion 18 of the shank 14 of the fastener 10 of the present invention thus ends as an outer end part 86, the outer end part 86 of the rolled thread 36 ending at the chamfered end portion 84 of the second portion 18 of the shank 14. This chamfered end portion 84 of the second portion 18 of the shank 14 provides the benefit of allowing the full thread capabilities of the rolled thread 36 of the fastener to be developed within the first rotation of the threaded nut 58 onto the second portion 18 of the shank 14 of the fastener 10 of the present invention. In other words, because the end portion of the shank 14 is chamfered and because the rolled thread 36 of the shank 14 ends as an outer end part 86 at the chamfered end portion 84, the threaded nut 58 need only be thread one rotation for the full thread capabilities of the fastener 10 to be developed. Thus, the fact that the threaded fastener 10 and threaded nut 58 connect together with full thread capabilities in the first rotation of the nut 58 provides the benefits of allowing the fastener 10 to be lighter and shorter, while also being safely and tightly connected together with the threaded nut 58. Further, the threaded nut 58 can be made shorter and lighter, because of this feature. It is noted in passing that, when the blank is chamfered prior to thread rolling, the outer end of the thread is not fully developed, and more turns of a nut are required for secure fastening.

The rolled thread 36 on the fastener is produced by a pair of thread rolling dies 40 and 42. (See FIGS. 6–10.) One of these dies is movable 40, while one of these dies is stationary 42. These dies 40, 42 are flat, but cylindrical dies also can be constructed embodying the principles of the present invention. The dies 40, 42 are used to roll threads 36 on the outer end part 88 of the shank on a blank 90, which is used to produce the completed fastener 10 of the present invention. The outer end part 88 of the blank 90 corresponds to the second portion 16 of the shaft 14 of the fastener 10 of the present invention. The shank 92 of the blank 90 preferably has a portion of larger diameter 94 adjacent its head 96, corresponding to the first portion 16 of the shank 14 of the fastener 10 and a short tapered transition surface 98 between the outer end portion 88, which corresponds to the third portion 20 of the shank 14 of the fastener 10. Prior to thread rolling, the outer end of the blank is flat and unchamfered.

Figure 7:
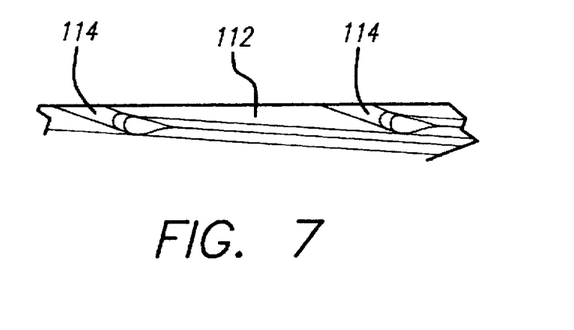
FIG. 7 is an enlarged fragmentary elevational view of FIG. 1 of a portion of one of the thread rolling dies.
Figure 9:
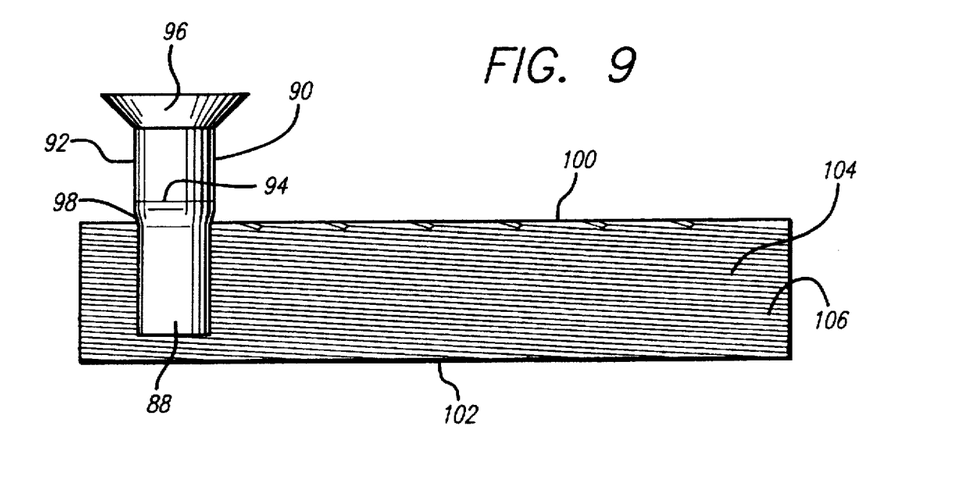
FIG. 9 is an elevational view of one of the thread rolling dies and the screw blank in position for the thread rolling operation.
Figure 10:
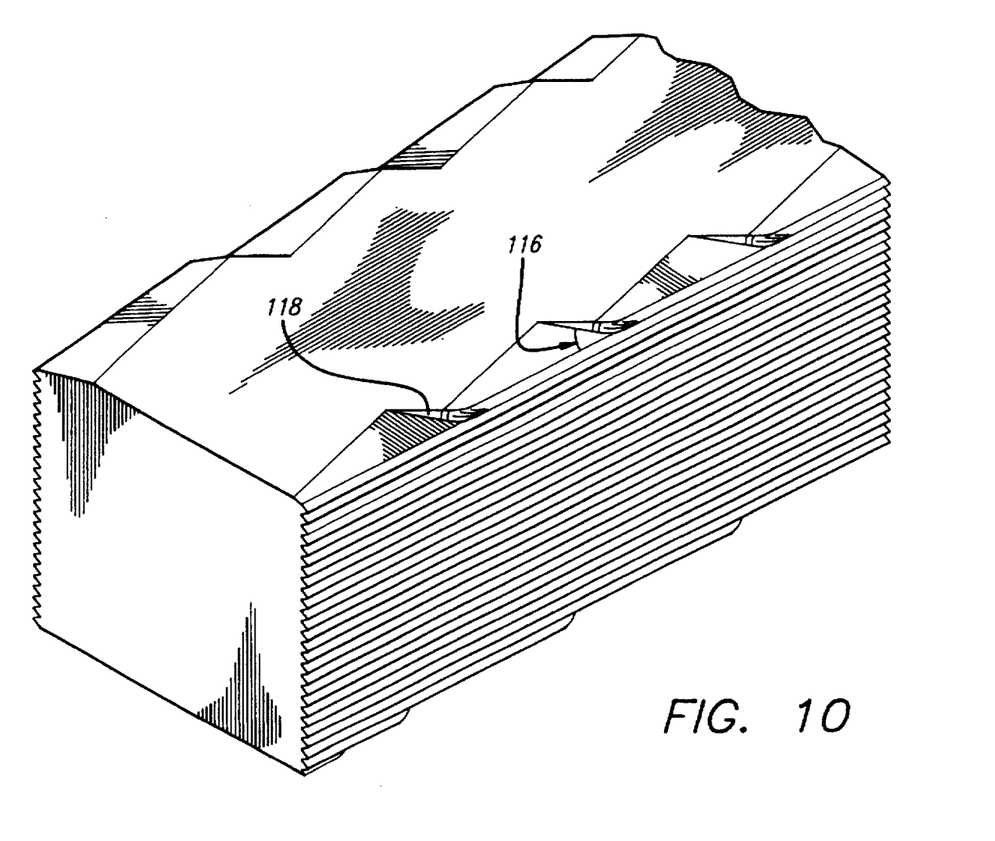
FIG. 10 is an enlarged fragmentary perspective view of one of the thread rolling dies.

The movable die 40 of the present invention is identical in configuration to the stationary die 42. The die 40 includes flat parallel longitudinal top 100 and bottom edges 102 and a vertical face 104 which is used in producing the rolled thread 36. Formed on the face is a series of parallel ridges 106 which are complementary to the rolled thread 36 to be produced, and are therefore generally V-shaped in end elevation. In accordance with standard practice, those ridges include flanks with a 60 degree included angle 108 between them. The ridges 106 are at an acute angle relative to the top and bottom edges 100, 102, appropriate for producing a thread helix when the blank 90 is rolled between the dies 40, 42. A plurality of the ridges have end surfaces 110 adjacent to the top edge 100 of the die which are transverse to the longitudinal axis of the ridges 106.

Figure 8:
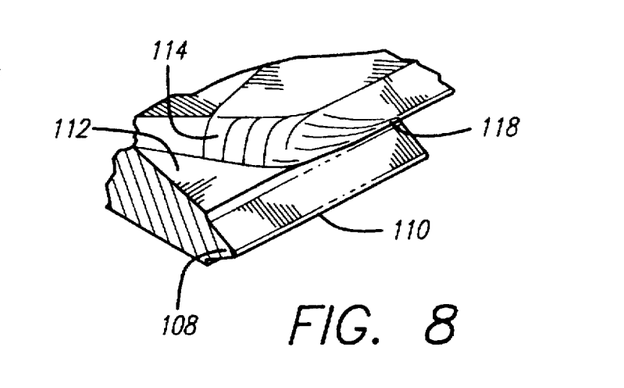
FIG. 8 is an enlarged fragmentary view illustrating a typical contour of the end of the thread-forming ridge of the die.

Between the top edge surface 100 of the die 40, 42 and the face 104 are a plurality of stepped beveled surfaces 112 which form part of the upper die edge 100. The beveled surfaces 112 are adjacent to the end surfaces 110 of the ridges 106. This beveled surface 112 is at an angle of 25 degrees relative to the top edge surface 120. Accordingly, the beveled surface 112 is at only a 15 degree differential with respect to the upwardly-facing flanks of the ridges 106 that run out at the surface 100. In practice, the surface 100 is made to blend with the flanks that it intersects. The vertical dimension of the surface 112 should be equal to at least twice the pitch of the thread to be produced to assure adequate clearance as the thread is formed. Further, the top edge of the die member 100 preferably includes a plurality of second surfaces 114. Each second surface 114 is adjacent to and forms an angle 116 with one of the beveled surfaces 112. The ridges 106 that intersect the beveled surface 112 of the top edge 100 of the die 40, 42 have relatively short ends 118 that blend in with the second surface 116 of the top edge 100 of the die 40, 42. The angle 116 formed between each of the second surfaces 114 and each of the end surfaces 110 of the ridges 106 is preferably approximately 30 degrees, although it may be between 25 degrees to 35 degrees. It is this relatively short end 118 of the ridges 106 that forms such 30 degree angle with the second surface 114 that produces the relatively short transition of the inner end part 52 of the rolled thread 36 on the fastener 10 of the present invention, wherein the depth of the rolled thread 36 of the inner end part 52 gradually decreases from a depth equal to the uniform depth 38 of the rolled thread 36 formed by the ridges 106 to no depth at the end of the inner end part 52.

This 30 degree angle 116 provides benefits over the known thread rolling dies described above. The die of the present invention has a longer die life as a result of this 30 degree angle as compared to a die having a 45 degree or greater angle. This longer die life is a result of the lesser shock and impact to the ridges when forming the rolled threads of the fastener with the die of the present invention. For instance, although a die having a 45 degree angle can produce approximately 40,000 threaded fasteners before the die can no longer be used, a die with a 30 degree angle 116 can produce approximately 48,000 threaded fasteners before die can no longer be used. In fact, the life of the dies has been shown to increase by as much as approximately 35 percent. The dies of the present invention have the additional benefit that the time required to set up the thread roll machine is reduced by approximately 40 percent. Further, the die of the present invention with the 30 degree angle 116 is easier to form, because the ends of the ridges are ground and then polished and buffed. Thus, the time to fabricate a pair of threaded rolling dies of the present invention is reduced by approximately 60 percent. The die of the present invention further produces a runout on the threaded fastener that is of a better appearance than the bump or cavity of the known fasteners.

The ends of the ridges 106 are spaced apart a distance that is approximately the same as the circumference of the thread to be produced at its pitch diameter. This encompasses some variation from the precise circumferential distance, as is well known by those of ordinary skill in the art. Further, the spacing between the ridge ends 118 is made such that there is an increase in height from one to the next, from the die end, where the thread rolling begins, to the opposite end, as is also well known to those of ordinary skill in the art.

The dies 40, 42 of the present invention are operated as conventional dies, with one die 40 being moved longitudinally relative to the other die 42. The screw blank 90 is positioned prior to the threading operation as shown in FIG. 4, which locates adjacent the end of the die 40, 42 and perpendicular to the die edge surface 104. Therefore, the inner end 52 of the rolled thread that is produced as the dies are actuated is formed by the angled ends 118 of the ridges 106, which results in the relatively short, yet strong, termination of the rolled thread 36 at its inner end part 52, as described above.

The blank 90 used to form the fastener 10 of the present invention and the threaded nut 58 are formed from any metallic material, however, for aerospace and aircraft applications, the preferable material is 6AL-4V Titanium, which is well known to those of ordinary skill in the art for being lightweight and strong. The blank 90 may also be an alloy steel or stainless steel. Further, the thread rolling dies 40, 42 of the present invention are preferably formed from any metallic material used to form such dies, as is well known to those of ordinary skill in the art.

While a particular form of the invention has been illustrated and described, it will be apparent that various modifications can be made without departing from the scope of the invention. For instance, the shank 14 of fastener 10 may contain more than three portions, and a rolled thread may be formed on more than one of the portions as desired. Further, the diameters of the first, second, and third portions of the shank of the fastener may be of equal or differing size, as desired, and the lengths of each portion of the shaft may vary from those shown in the drawings depending on the intended use of the fastener. Accordingly, it is not intended that the invention be limited by the specific embodiment disclosed in the drawings and described in detail hereinabove.

We claim:

1. A combination first fastened element and second fastened element fastened together by a lightweight, compact, threaded fastener and a threaded nut, the combination comprising:

a threaded fastener comprising:

a head; and a shank projecting from the head, the shank having a first portion, a second portion, and a third portion;

the first portion of the shank being adjacent to the head, being cylindrical and having a predetermined diameter, being of a predetermined length, and being unthreaded;

the second portion of the shank being of a predetermined length, having a rolled thread thereon of uniform depth, having a major diameter no greater than the diameter of the first portion and having a chamfered end portion;

the third portion of the shank interconnecting the first and second portions of the shank and extending axially from a first end to a second end in a predetermined length and differing in diameter from the first and second portions of the shank, the rolled thread of the second portion ending within the length of the third portion of the shank as an inner end part, the depth of the rolled thread of the inner end part gradually decreasing along a linear path from a depth equal to the uniform depth of the rolled thread throughout the length of the second portion at the first end of the third portion to no depth at the end of the inner end part, the inner end part extending no more than one-third the circumference of the rolled thread at its pitch diameter so as to provide an end transition from the full depth of the rolled thread to the inner end part of the rolled thread, the rolled thread of the second portion of the shank ending as an outer end part, the outer end part of the rolled thread ending at the chamfered end portion of the second portion of the shank, and the third portion of the shank having an axial length from its first end to its second end not exceeding approximately a distance corresponding to between one and one-third pitch and one and one-half pitch of said thread;

a threaded nut and washer comprising:

a washer element having an unthreaded opening for accepting the shank of the threaded fastener, the opening having a diameter, the washer element further having a lower edge which flares outwardly; and a fastening element projecting from the washer element, the fastening element having an opening along its axial length, the opening having an inside surface having a thread thereon of uniform depth along a predetermined distance along the axial length of the inside surface of the opening, the thread of the fastening element being threadable with the rolled thread of the second portion of the shank of the fastener, the fastening element further having a outer wrenching surface, wherein the fastening element further includes a locking element for locking the threaded opening of the fastening element to the fastener, the locking element comprising a non-circular portion of the opening of the fastening element along a predetermined distance along the axial length of the fastening element, wherein the full thread capabilities of the fastener are developed within the first rotation of the threaded nut onto the second portion of the shank of the fastener;

a first fastened element having an opening for accepting the threaded fastener; and a second fastened element having an opening for accepting the threaded fastener.

2. A combination first fastened element and second fastened element fastened together by a lightweight, compact, threaded fastener and a threaded nut, the combination comprising:

a threaded fastener comprising:

a head; and a shank projecting from the head, the shank having a first portion, a second portion, and a third portion;

the first portion of the shank being adjacent to the head, being cylindrical and having a predetermined diameter, being of a predetermined length, and being unthreaded;

the second portion of the shank being of a predetermined length, having a rolled thread thereon of uniform depth throughout the length of the second portion, having a major diameter no greater than the diameter of the first portion and having an end portion;

the third portion of the shank interconnecting the first and second portions of the shank and extending axially from a first end to a second end in a predetermined length and differing in diameter from the first and second portions of the shank, the rolled thread of the second portion ending within the length of the third portion of the shank as an inner end part, the depth of the rolled thread of the inner end part gradually decreasing along a linear path from a depth equal to the uniform depth of the rolled thread throughout the length of the second portion at the first end of the third portion to no depth at the end of the inner end part, the inner end part extending no more than one-third the circumference of the rolled thread at its pitch diameter so as to provide an end transition from the fall depth of the rolled thread to the inner end of the thread, and the third portion of the shank having an axial length from its first end to its second end not exceeding approximately a distance corresponding to between one and one-third pitch and one and one-half pitch of said thread;

a threaded nut comprising:

a fastening element having an opening along its axial length, the opening having an inside surface, having a thread thereon of uniform depth along a predetermined distance along the axial length of the inside surface of the opening, the thread of the fastening element being threadable with the rolled thread of the second portion of the shank of the fastener, the fastening element further having an outer wrenching surface, wherein the fastening element further includes a locking element for locking the threaded opening of the fastening element to the second portion of the fastener;

a first fastened element having an opening for accepting the threaded fastener; and a second fastened element having an opening for accepting the threaded fastener.

3. A lightweight, compact, threaded fastener comprising:

a head; and a shank projecting from the head, the shank having a first portion, a second portion, and a third portion;

the first portion of the shank being adjacent to the head, being cylindrical and having a predetermined diameter, being of a predetermined length, and being unthreaded;

the second portion of the shank being of a predetermined length, having a rolled thread thereon of uniform depth, having a major diameter no greater than the diameter of the first portion and having an end portion; and the third portion of the shank interconnecting the first and second portions of the shank and extending axially from a first end to a second end in a predetermined length and differing in diameter from the first and second portions of the shank, the rolled thread of the second portion ending within the length of the third portion of the shank as an inner end part, the depth of the rolled thread of the inner end part gradually decreasing along a linear path from a depth equal to the uniform depth of the rolled thread throughout the length of the second portion at the first end of the third portion to no depth at the end of the inner end part, the inner end part extending no more than one-third the circumference of the rolled thread at its pitch diameter so as to provide an end transition from the fall depth of the rolled thread to the inner end part of the rolled thread, and the third portion of the shank having an axial length from its first end to its second end not exceeding approximately a distance corresponding to between one and one-third pitch and one and one-half pitch of said thread.

4. The lightweight, compact, threaded fastener of claim 3 wherein the end portion of the second portion of the shank is chamfered.

5. The lightweight, compact, threaded fastener of claim 4, wherein the rolled thread of the second portion of the shank ends as an outer end part, the outer end part of the rolled thread ending at the chamfered end portion of the second portion of the shank.

6. A lightweight, compact, threaded fastener comprising:
a head; and
a shank projecting from the head, the shank having a first portion, a second portion, and a third portion;
the first portion of the shank being adjacent to the head, being cylindrical and having a predetermined diameter, being of a predetermined length, and being unthreaded;
the second portion of the shank being of a predetermined length, having a rolled thread thereon of uniform depth, having a major diameter no greater than the diameter of the first portion and having a chamfered end portion;
the third portion of the shank interconnecting the first and second portions of the shank and extending axially from a first end to a second end in a predetermined length and differing in diameter from the first and second portions of the shank, the rolled thread of the second portion ending within the length of the third portion of the shank as an inner end part, the depth of the rolled thread of the inner end part gradually decreasing along a linear path from a depth equal to the uniform depth of the rolled thread throughout the length of the second portion at the first end of the third portion to no depth at the end of the inner end part, the inner end part extending no more than one-third the circumference of the rolled thread at its pitch diameter so as to provide an end transition from the full depth of the rolled thread to the inner end part of the rolled thread, the rolled thread of the second portion of the shank ending as an outer end part, the outer end part of the rolled thread ending at the chamfered end portion of the second portion of the shank, and the third portion of the shank having an axial length from its first end to its second end not exceeding approximately a distance corresponding to between one and one-third pitch and one and one-half pitch of said thread.

7. The method of providing a lightweight, compact fastener having a head and a shank having an unthreaded cylindrical portion adjacent the head, an outer end portion having a fully formed rolled thread thereon of a predetermined pitch and predetermined uniform configuration, and a transition part between the unthreaded cylindrical portion having the runout of the inner end part of the thread thereon, comprising the steps of:
providing a pair of dies, each die being provided with a member having a top edge and having a plurality of spaced, unchamfered parallel ridges on one side thereof, the ridges being complementary to a thread to be produced and the ridges being at an acute angle to the top edge of the member, a plurality of the ridges having end surfaces adjacent to the top edge of the member which are transverse to the longitudinal axis of said ridges, and the top edge of the member including a plurality of beveled surfaces, the beveled surfaces being adjacent to the end surfaces of the ridges and including a plurality of second surfaces, each second surface being adjacent to and forming an angle with one of the beveled surfaces, wherein the angle formed between each of the second surfaces and each of the end surfaces of the ridges is approximately 25–35 degrees;
providing a blank having a head and a cylindrical shank projecting from the head, with a first section of relatively large diameter adjacent to the head, a second section of relatively small diameter at the outer end of said shank, and a transition section interconnecting the first and second sections and axially extending a predetermined length and differing in diameter from the first and second sections, the length of the transition section being between one and one-third pitch and one and one-half pitch and wherein the entire end of the second section of the blank, away from the head, is flat and unchamfered prior to thread rolling;
positioning the shank of the blank between the dies;
relatively moving the dies so as to cause the ridges of the dies to engage and form a thread of the predetermined uniform configuration and predetermined pitch on the second section of the blank to thereby form a threaded fastener, wherein the end surfaces of the ridges of the member engage only the transition section of the blank to form the inner end part of the rolled thread, the depth of the rolled thread of the inner end part gradually decreasing along a linear path from a depth equal to the uniform depth of the rolled thread formed by the ridges to no depth at the end of the inner end part;
chamfering the end of the section portion of the shank following thread rolling;
wherein the threaded fastener has full thread capabilities within the first rotation of a threaded nut thereon and has an inner end part which gradually decreases along a linear path from a fall depth to no depth within one-third circumference of the rolled thread at its pitch diameter and is free of stress concentration at the start of the thread adjacent the transition section.

8. The method of providing a lightweight, compact fastener having a head and a shank having an unthreaded cylindrical portion adjacent the head, an outer end portion having a fully formed rolled thread thereon of a predetermined pitch and predetermined uniform configuration, and a transition part between the unthreaded cylindrical portion having the runout of the inner end part of the thread thereon, comprising the steps of:
providing a pair of dies, each die being provided with a member having a top edge and having a plurality of spaced parallel, unchamfered ridges on one side thereof, the ridges being complementary to a thread to be produced and the ridges being at an acute angle to the top edge of the member, a plurality of the ridges having end surfaces adjacent to the top edge of the member which are transverse to the longitudinal axis of said ridges, and the top edge of the member including a plurality of beveled surfaces, the beveled surfaces being adjacent to the end surfaces of the ridges and including a plurality of second surfaces, each second surface being adjacent to and forming an angle with one of the beveled surfaces, wherein the angle formed between each of the second surfaces and each of the end surfaces of the ridges is approximately 25–35 degrees;
providing a blank having a head and a cylindrical shank projecting from the head, with a first section of relatively large diameter adjacent to the head, a second section of relatively small diameter at the outer end of said shank, and a transition section interconnecting the first and second sections and axially extending a predetermined length and differing in diameter from the first and second sections, the length of the transition section being between one and one-third pitch and one and one-half pitch;
positioning the shank of the blank between the dies; and relatively moving the dies so as to cause the ridges of the dies to engage and form a thread of the predetermined uniform configuration and predetermined pitch on the second section of the blank, wherein the end surfaces of the ridges of the member engage only the transition section of the blank to form the inner end part of the rolled thread, the depth of the rolled thread of the inner end part gradually decreasing along a linear path from a depth equal to the uniform depth of the rolled thread formed by the ridges to no depth at the end of the inner end part.

9. The method of claim 8 wherein the entire end of the second section of said blank, away from said head, is flat and unchamfered prior to thread rolling, and further including the step of chamfering the end of the second portion of the shank of the fastener following thread rolling.

10. The lightweight, compact, threaded fastener formed by the method of claim 8.

11. The method of fastening a first fastened element having an opening to a second fastened element having an opening, the method comprising:

placing a threaded fastener through the opening of the first fastened element and through the opening of the second fastened element, the threaded fastener extending beyond the opening of the second fastened element, the threaded fastener comprising:

a head; and a shank projecting from the head, the shank having a first portion, a second portion, and a third portion;

the first portion of the shank being adjacent to the head, being cylindrical and having a predetermined diameter, being of a predetermined length, and being unthreaded;

the second portion of the shank being of a predetermined length, having a rolled thread thereon of uniform depth, having a major diameter no greater than the diameter of the first portion and having an end portion;

the third portion of the shank interconnecting the first and second portions of the shank and extending axially from a first end to a second end in a predetermined length and differing in diameter from the first and second portions of the shank, the rolled thread of the second portion ending within the length of the third portion of the shank as an inner end part, the depth of the rolled thread of the inner end part gradually decreasing along a linear path from a depth equal to the uniform depth of the rolled thread throughout the length of the second portion at the first end of the third portion to no depth at the end of the inner end part, the inner end part extending no more than one-third the circumference of the rolled thread at its pitch diameter so as to provide an end transition from the full depth of the rolled thread to the inner end part of the rolled thread, and the third portion of the shank having an axial length from its first end to its second end not exceeding approximately a distance corresponding to between one and one-third pitch and one and one-half pitch of said thread;

attaching a threaded nut to the end of the threaded fastener by rotating the threaded nut onto the threaded fastener, the threaded nut comprising:

a fastening element having an opening along its axial length, the opening having an inside surface having a thread thereon of uniform depth along a predetermined distance along the axial length of the inside surface of the opening, the thread of the fastening element being threadable with the rolled thread of the second portion of the shank of the threaded fastener, wherein the fastening element further includes a locking element for locking the threaded opening of the fastening element to the second portion of the threaded fastener.

12. A thread rolling die comprising:

a member having a top edge and having a plurality of spaced parallel, unchamfered ridges on one side thereof, the ridges being complementary to a thread to be produced and the ridges being at an acute angle to the top edge of the member;

a plurality of the ridges having end surfaces adjacent to the top edge of the member which are transverse to the longitudinal axis of said ridges;

the top edge of the member including a plurality of beveled surfaces, the beveled surfaces being adjacent to the end surfaces of the ridges and including a plurality of second surfaces, each second surface being adjacent to and forming an angle with one of the beveled surfaces, wherein the angle formed between each of the second surfaces and each of the end surfaces of the ridges is approximately 25–35 degrees.

13. The thread rolling die of claim 12, wherein the ridges of the member produce a rolled thread having a uniform depth and wherein the end surfaces of the ridges form an inner end part of the rolled thread, the depth of the rolled thread of the inner end part gradually decreasing from a depth equal to the uniform depth of the rolled thread formed by the ridges to no depth at the end of the inner end part.

* * * * *